United States Patent [19]

Foster et al.

[11] 4,037,086

[45] July 19, 1977

[54] VERTICAL NAVIGATION GUIDANCE SYSTEM

[75] Inventors: George B. Foster, Worthington; Paul Douglas Gibbs, Blacklick, both of Ohio

[73] Assignee: Air Data, Inc., Worthington, Ohio

[21] Appl. No.: 476,514

[22] Filed: June 5, 1974

[51] Int. Cl.$^2$ ................... G06F 15/50; G01C 21/20
[52] U.S. Cl. ............................. 235/150.22; 244/161
[58] Field of Search ............... 235/150.22, 150.26, 235/150.27; 244/77 A; 343/5 GC

[56] References Cited

U.S. PATENT DOCUMENTS

| | | | |
|---|---|---|---|
| 3,621,211 | 11/1971 | Perkins | 235/150.27 |
| 3,652,837 | 3/1972 | Perkins | 235/150.27 |
| 3,666,929 | 5/1972 | Menn | 235/150.22 |
| 3,740,004 | 6/1973 | Doniger et al. | 235/150.22 X |
| 3,752,967 | 8/1973 | Vietor | 235/150.22 |

*Primary Examiner*—Edward J. Wise
*Attorney, Agent, or Firm*—Cennamo, Kremblas & Foster

[57] ABSTRACT

There is disclosed a vertical guidance computer for general aviation aircraft operating in conjunction with an area navigation system to convert data representing the range from the aircraft to a runway or other target into a measure of the altitude at which the aircraft should be for a given descent rate. Means are provided for adding a correction representing the mean sea level altitude of the runway, and for pre-establishing an adjustable minimum descent altitude. When the range corresponding to the minimum descent altitude is reached, an appropriate warning is given. The system utilizes a time analog of range data and a scaling of the basic system clock in accordance with the desired glide slope or descent rate. The scaling is such that the number of cycles of the scaled clock directly represents the command altitude in feed above mean sea level.

15 Claims, 4 Drawing Figures

VERTICAL NAVIGATION GUIDANCE SYSTEM

INTRODUCTION AND BACKGROUND

The present invention relates to aircraft navigation, and more particularly to vertical navigation guidance equipment having several important advantages over heretofore existing designs.

Vertical guidance equipment for general aviation aircraft is currently available in several different forms. For example, ILS installations provide localizer (directional) and also glide slope (vertical capabilities. This is available at many but not all general aviation airports, and moreover, not all aircraft are equipped with the rather expensive ILS equipment.

Where the airport and/or aircraft are not ILS equipped, some other form of vertical guidance equipment is particularly advantageous. One way to accomplish this is as an adjunct to so called area navigation (RNAV) systems. RNAV is an outgrowth of the availability of a network of radio navigation aids called VORTAC's. These combine the capabilities of standard VHF omni directional range equipment with the TACAN tactical air navigation system to provide signals which are utilized on board an aircraft to provide bearing and range information for the aircraft with respect to the VORTAC facility. For RNAV systems, the VORTAC range and bearing are used to define a series of arbitrary reference locations called waypoints. These have no radio facilities, and are located at an address defined by the range and bearing to a nearby VORTAC. Then, the RNAV system computes aircraft range and bearing to the waypoint based on the waypoint address and the aircraft position with respect to the VORTAC.

RNAV systems of the type referred to above, are the subject of assignee's Bean U.S. Pat. No. 3,750,942 and Abnett et al U.S. Pat. No. 3,796,867, the disclosures of which are incorporated herein by reference to the extent pertinent.

Aircraft to waypoint range data generated by an RNAV system may be used directly to generate vertical guidance information in the absence of an ILS facility. By defining a waypoint at the runway, and establishing a suitable descent angle, the desired altitude as a function of the range to the runway can be computed directly from the resulting right triangle. Equipment for the above purpose is available, but it is characterized by several important disadvantages. First, the heretofore available equipment provides up-down steering commands based on comparison of the desired altitude with the reading of an encoding altimeter, thus, useful information can be derived only after a suitable barometric correction, obtained from a ground station at or near the airport. More importantly, however, is the fact that the resulting command is totally qualitative beyond the range of the up-down command needle. Thus, for a substantial departure from the required altitude, the up-down needle is pegged at "down" and the pilot has no quantitative indication of the actual error. In ILS operation, the aircraft might reach the ILS "outer marker" at an excessive altitude, and will be unable to make a straight-in landing. The same is obviously true in the case of a non-instrument, i.e. visual approach, wherein an outer-marker may not even be available.

Another difficulty with heretofore available equipment relates to the establishment of a minimum descent altitude (MDA), i.e. that altitude below which the aircraft may not descend without having the runway in sight. For most airports, and typical general aviation aircraft, a appropriate value for the MDA is about 400 feet above ground level. However, certain conditions, such as radio propagation effects resulting from the location of the VORTAC, the particular direction of approach to the airport, length of runway, etc., may individually and/or collectively dictate some other value for the minimum descent altitude. Prior equipment provides a warning to the pilot at the range corresponding to the typical 400 foot minimum descent altitude, but no provision exists for selecting another MDA value.

Another disadvantage of prior equipment relates to selection of the appropriate descent rate. The usual descent rate for general aviation aircraft is 3°, i.e. approximately 300 feet per nautical mile. Other descent rates may also be desirable, and indeed, the Federal Aviation Administration has considered the possibility of a two segment glide slope having a descent rate of 600 feet per nautical mile at the beginning of the descent, and a 300 feet per nautical mile slope for the terminal portion of the descent. No provision for a variable descent rate has heretofore been available, except for designs not appropriate for general aviation use because of cost, weight or size.

BRIEF DESCRIPTION OF THE INVENTION

The present invention seeks to overcome the aforementioned disadvantages of heretofore available equipment in a system including means for establishing the range from the aircraft to the runway (or more generally, any target position) means for establishing a value for the altitude above mean sea level (MSL) of the target location, means for establishing a desired minimum descent altitude (MSD) and means for selecting a desired descent rate. The above described parameters are represented electrically, and provided to a suitable processing apparatus, coupled to a digital display to show the altitude (MSL) at which the aircraft should be for a particular range to the target location, target altitude, and descent rate. In addition, the processor responds to the preset MDA to provide a warning when the altitude at which the aircraft should be for the established descent angle equals the MDA. Thereafter, the displayed command altitude values remains at the MDA and the display is continuously flashed as a warning to the pilot.

As previously mentioned, the vertical guidance computer of this invention is particularly adapted for use with an area navigation system such as that shown in the above mentioned Bean and Abnett et al patents. In this connection, the RNAV system provides certain primary timing and other signals which are utilized by a direct time scaling process to generate the command altitude information. However, from the standpoint of general utility, the system may be utilized in conjunction with any other source of range information to a target location such as a VORTAC. Alternatively, in the context of area navigation, the waypoint need not be located on a runway, in which case the vertical guidance computer can provide general descent guidance as a waypoint is being approached, or ascent guidance information as the range from the aircraft to the waypoint increases.

An additional feature of the invention is the inclusion of means for correcting the command altitude for the mean sea level of the target location, as mentioned above. Particularly is the context of the direct time scaling for the incoming RNAV data, the inclusion of the waypoint altitude memory permits an output display in distance above sea level. This is preferable since the normal experience and practice of pilots makes consideration of the command altitude (and corrections thereof based on altimeter reading) a more comfortable and natural procedure.

Another feature of this invention is the utilization of the above mentioned digital display to facilitate accurate preestablishment of the altitude of the waypoint and the minimum descent altitude. By inter-connecting the target altitude and minimum descent altitude setters to the display, precise establishment of these values is possible.

Further, as will be appreciated in the context of the general aviation aircraft market, equipment cost is a serious consideration and thus compromises are frequently necessary when desired features prove to be costly. In the present instance, the design employed permits the incorporation of means to establish two alternative descent rates, i.e. the standard three degree slope and a six degree slope. Further, the techniques employed, allow inexpensive incorporation of other descent rates as well.

Accordingly, it is among the objects of this invention to provide the following:

Improved vertical navigation guidance apparatus;

Vertical navigation guidance apparatus adapted for use with area navigation equipment;

Vertical navigation guidance equipment providing direct display is digital form of the altitude at which the aircraft should be for its range to a selected target location at a given descent angle;

Generation of the command altitude data by a direct time scaling of the range of the aircraft to the target location;

Correction and display in terms of distance above mean sea level as a matter of user convenience;

Vertical navigation guidance equipment allowing selection of the target location altitude above mean sea level;

Vertical navigation guidance equipment allowing the selection of the minimum descent altitude above mean sea level;

Vertical navigation guidance equipment permitting digital display of the values of target location altitude and minimum descent altitude while the same are being set;

Vertical navigation guidance equipment permitting the selection of at least two different descent rates;

Vertical navigation guidance equipment in which the display of the command altitude is caused to flash as a warning to the pilot and to remain fixed when the required altitude reaches the minimum descent altitude previously established;

Vertical navigation guidance equipment including means for generating a signal representing the range from the aircraft to a target location, means for establishing the altitude of the target location above mean sea level, means for establishing minimum descent altitude above sea level, means for establishing the desired descent rate, a command altitude processor for providing a signal representing the altitude at which the aircraft should be for the measured range, means to display the command altitude, and means for flashing the display and fixing the displayed value at the minimum descent altitude when the command altitude and the minimum descent altitude are equal.

The exact nature of the present invention, as well as other objects and advantages thereof, will become apparent from consideration of the following detailed description, in connection with the drawing, in which.

DETAILED DESCRIPTION OF THE INVENTION

Figure 1:
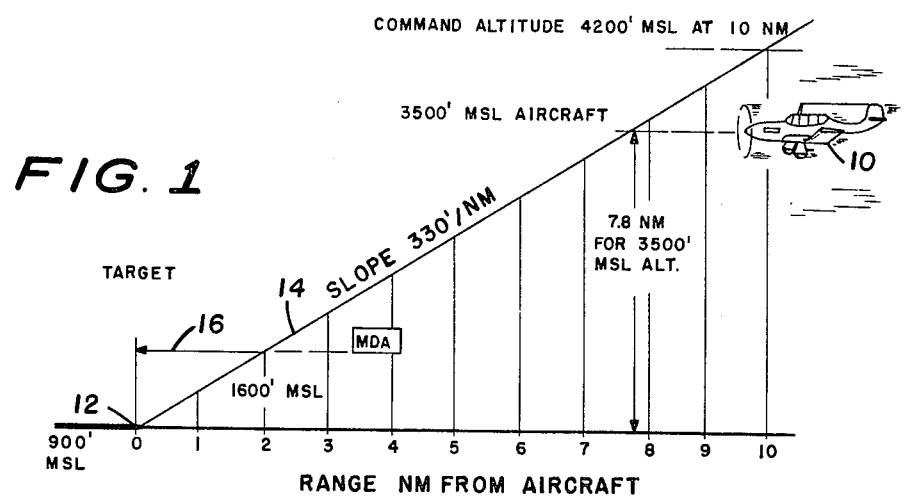
FIG. 1 is a diagram showing the various parameters pertinent to vertical navigation guidance.

Referring first to FIG. 1, there is shown a representation of an aircraft 10 approaching a target location 12. This could be a runway, or some other location defined by a waypoint using an area navigation system, or even by the actual location of a VORTAC. FIG. 1 also shows a glide slope 14, having a slope of 330 feet per nautical mile. For reasons explained hereinafter, the glide slope used corresponds to a slope approximately 3.15° rather than the nominal 3.0°. This has no particular effect on aircraft operation, except to place the aircraft at a slightly higher altitude for a given range to the target 12 than the nominal 3 degree slope. Various command altitudes are shown for different ranges along slope 14, i.e. the altitude at which the aircraft should be for a given distance to target location 12. Also shown is a minimum descent line 16, i.e. the altitude below which the aircraft may not descend without a visual fix on the runway.

For the illustration shown, the runway lies at an altitude of 900 feet (MSL) with a minimum descent altitude of 700 feet above the runway, or 1600 feet (MSL). Also in the example shown, the aircraft is at an altitude of 3500 feet (MSL) at a range of approximately 10 miles. According to glide slope 14, this is 700 feet below the command altitude. (The pilot can readily ascertain this by observing his altimeter and comparing the actual altitude with the command altitude display hereinafter described). Knowing that the aircraft is below the command altitude, the pilot maintains altitude (or ascends) until the aircraft intercepts the glide slope. Then by maintaining a constant 3° descent, the aircraft approaches the target at the desired slope.

As illustrated, at a range of 2 nautical miles, the 1600 feet MDA is encountered, and the pilot refrains from further descent unless the runway is in sight. A suitable display warning, also described below, is given commencing at the two mile range, and continuing throughout the remainder of the descent procedure.

Figure 2:
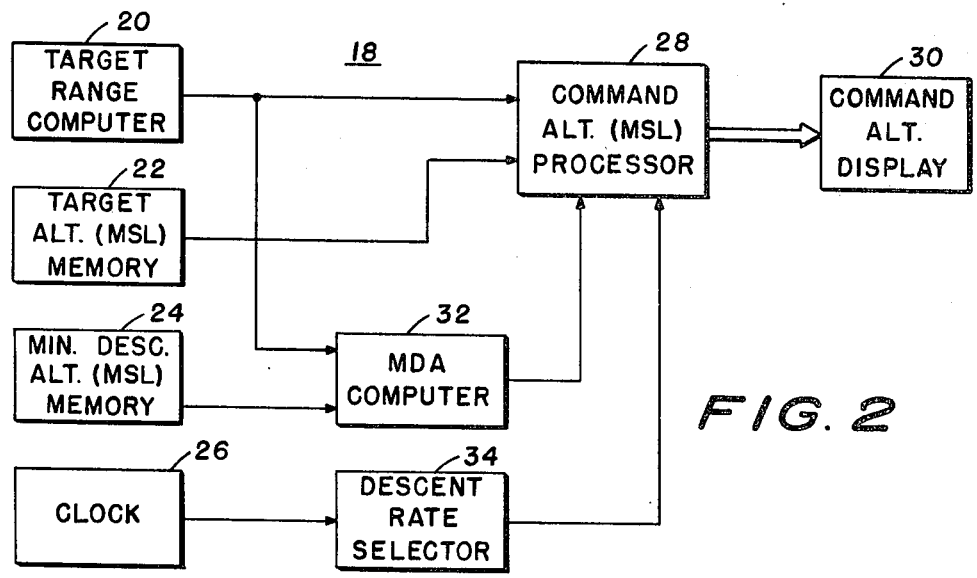
FIG. 2 is a simplified block diagram of the vertical navigation guidance computer of the present invention.

FIG. 2 illustrates in general form a block diagram of the vertical guidance computer of this invention. The system, generally denoted at 18, includes a target range computer 20, a target altitude memory 22, a minimum descent altitude memory 24, and a system clock 26. The target range computer 20 and the target altitude memory 22 are coupled as two inputs to the command altitude processor 28 which provides a command altitude display by means of a digital display unit 30.

The outputs of target range computer 20, and minimum descent altitude memory 24 are coupled as inputs to a minimum descent altitude computer 32 which provides a third input to processor 28. The fourth input to processor 28 is provided by means of a descent rate selector 34, the input to which is provided by means of clock 26.

Target range computer 20 is generally representative of any of a number of possible means for generating an electrical signal analog of the range from the aircraft to the touchdown point or other target. In a typical application, however, target range computer 20 represents the computer portion of as RNAV system such as shown in the Bean and Abnett et al patents. Target altitude memory 22 and minimum descent altitude memory 24 represent suitable memory devices by which preselected values of target altitude and MDA are stored. Clock 26 represents a master frequency chosen at any desired frequency which lends itself conveniently to selection of one or more desired descent rates by means of descent rate selector 34.

Implicit in the matter of designation of the reference source as a clock and a descent rate selector is the fact that the operation of command altitude processor 28 is on a counting or a time basis, but it should be recognized that analog processing is also possible. However, with the preferred digital display unit 30, digital processing, i.e. based on pulse counting, yields results which are extremely accurate, and convenient and inexpensive to accomplish.

Figure 3:
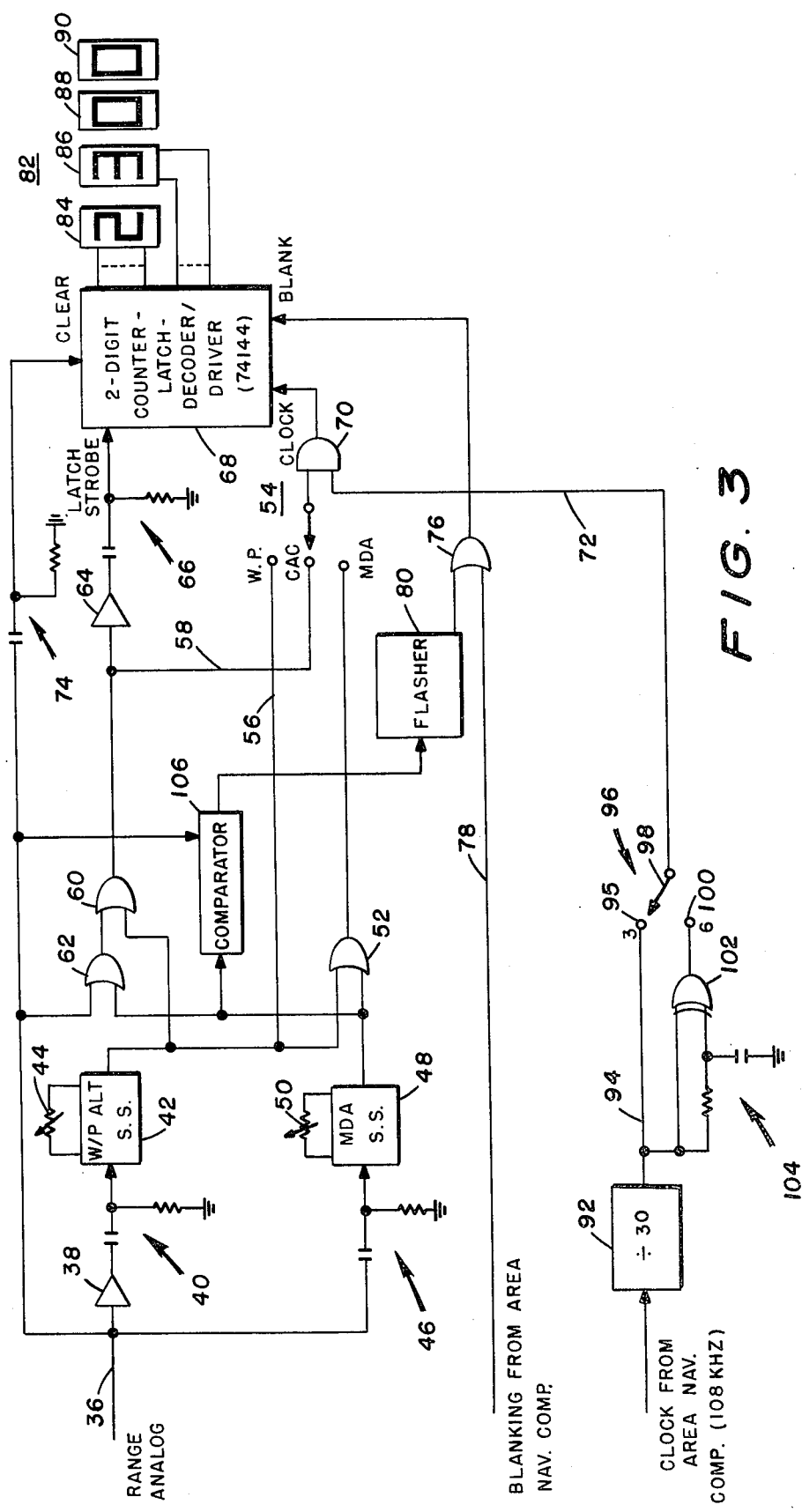
FIG. 3 is a detailed block diagram of FIG. 2.

Referring now to FIG. 3, there is illustrated a detailed version of the system shown in FIG. 2 representing a preferred embodiment of the invention. The system operates in conjunction with an area navigation system such as disclosed in the Bean or Abnett et al patents. For this reason, is the embodiment shown, advantage is taken of the availability of various RNAV signals to avoid additional signal processing.

In particular, the Bean and Abnett et al RNAV systems provide a time analog of the range from the waypoint to the aircraft, i.e. a pulse, the duration of which is representative of the range. For reasons described in detail in the Bean and Abnett et al patents, it is found advantageous to provide a basic RNAV clock frequency of 108 kHz. This basic clock frequency is used throughout the RNAV system and results in a time duration scaling for range data of 925 microseconds per nautical mile. All distance time scaling in the vertical guidance computer shown in FIG. 3 is therefore adjusted to this system scale factor, and likewise, because the range data is already keyed to the basic RNAV clock, this same clock is used directly in the vertical navigation computer without recourse to a separate primary frequency source.

Referring to FIG. 3, the range time analog data pulse, in the form of a so-called "range block" is provided over lead 36 from the RNAV unit and coupled through an inverter 38 and a RC differentiating network 40 to the input of the target altitude memory 42. This is preferably a single shot having an adjustable operating period selected by means of a variable resistor 44. The range block signal is also coupled through a second RC differentiator network 46 to the trigger input of the MDA memory 48. This too is preferably a single shot having an adjustable operating period selected by means of a variable resistor 50. The values of timing resistors 44 and 50 are selected in light of the time scaling of the range block, i.e. so time periods for single shots 42 and 44 are achievable in the expected range of the waypoints and minimum descent altitudes.

The outputs of single shots 42 and 48 are coupled as the inputs to an OR gate 52, the output of which is coupled to one of the fixed contacts (labeled MDA) of a three-position switch 54. A second fixed switch position (labeled W.P. or waypoint) is provided directly from the output of waypoint altitude single shot 42 by means of lead 56. The third input for switch 54 (labeled CAC) is provided over lead 58 by the output of an OR gate 60. This receives as inputs, the output of waypoint single shot 42, and the output of a further OR gate 62. The latter, in turn, receives as its inputs, the range block signal lead 36, and the output of MDA single shot 48. The output of OR gate 60 is also provided through an inverter 64 and a further RC differentiating network 66 as the "LATCH STROBE" input of a digital display processor unit 68, preferably constructed of a pair of integrated circuits, Texas instruments type 74144. These provide a combination of counter, latch, and decoder/driver functions for each digit of a seven segment display element on a single chip, but it should be recognized that other arrangements may be used as well.

The moving contact of switch 54 is coupled to one input of an AND gate 70, the second input to which is provided over a lead 72 as hereinafter described. The output of AND gate 70 is provided as the CLOCK, i.e. advance input for display processor unit 68. Two additional inputs, namely a CLEAR and a BLANK input are also provided to processor unit 68. The former is provided by the range block on lead 36 coupled through an RC differentiator network 74, while the latter is provided by means of an OR gate 76, receiving as one input, a blanking signal from the area navigation computer on lead 78, and a second input from a flasher unit 80 hereinafter described.

The output of processor unit 68 is coupled to a digital display 82, including four digits; 84, 86, 88 and 90, each in the form of a seven bar segment display element of conventional construction. The most significant digit display units 84 and 86 are controlled by the outputs of processor unit 68, while the least significant digit display units 88 and 90 are hardwired to maintain a constant zero display value. Thus, digital display unit 82 provides a maximum output reading of 9900 in 100 foot increments, i.e. having a resolution of 100 feet. As explained hereinafter, display unit 82 is used not only to provide command altitude information to the pilot (with switch 54 in the CAC position), but also to assist in setting the values for variable resistors 44 and 50 by which the waypoint and minimum descent altitudes are programmed in the system (with switch 54 in the W.P. and MDA positions respectively).

Referring back to FIG. 1, for a given angle of descent (a), and a particular range (R) the Command Altitude (C.A.) is given by the relationship:

$$C.A. = R \tan(a)$$

In the embodiment of FIG. 3, the relationship of Eq. (1) is utilized in a direct time scaling of the range time analog signal to develop a time analog of the command altitude. For the nominal glide slope of 3°, conversion of range (in nautical miles) to command altitude (in feet) requires a scale factor of 0.0366. As will be appreciated, this requires a non-integral division of the 108 kHz clock frequency, which is obviously quite impractical. One alternative is a clock frequency other than 108 kHz, but in accordance with this invention, a preferred alternative is based on recognition that for the 108 kHz clock, a scale factor of 1/30 produces a scale factor for Eq. 1 corresponding to the tangent of the angle 3.15°.

This yields a glide slope of 330 feet per nautical mile rather than 300 feet per nautical mile and is perfectly satisfactory for all practical purposes.

The required time scaling is accomplished by dividing the 108 kHz clock signal by 30, and utilizing the range block signal to gate the divided down clock as the driver for display processor 68. With reference, however, to FIGS. 1 and 3, it will be appreciated that the direct time scaling of the range block signal to generate command altitude yields a value representing altitude above ground level, and indeed, it is a feature of this invention that such a direct time scaling conversion could be accomplished and utilized. However, normal practices and procedures in air navigation, and the experience of most pilot suggests that greater convenience results if altitude measurements are displayed with respect to mean sea level rather than ground level. It is thus found advantageous to include in the processing circuitry, means to correct for the variable distance above mean sea level which would be applicable to the location of a particular runway or other target. The result is solution of the equation:

$$C.A. = R \tan(a) + A(MSL) \qquad (2)$$

where A(MSL) is the altitude of the runway above mean sea level.

Referring still to FIG. 3, the required time scaling of the 108 kHz RNAV clock might be accomplished by means of a divide-by-30 counter 92 which might comprise, for example, a decade counter and a dual J-K flip flop unit coupled as a divide by 3 counter. Actually, for the RNAV systems of the Bean and Abnett et al patents, there is available a 10.8 kHz clock at TTL compatible signal levels and impedances whereby counter 92 in FIG. 3 need only be a divide-by-three counter.

The output of Counter 92 on lead 94 at 3.6 kHz is coupled to a fixed contact 95 (labeled 3) of a frequency selection switch 96, moving contact 98 of which is connected as the signal input to AND gate 70. As previously mentioned, the latter is gated by the range block, to drive processor 68 and ultimately yield a display of the command altitude.

The second fixed contact 100 of switch 96 is connected to the output of an EXCLUSIVE OR circuit 102. This operates as a frequency doubler to provide a clock frequency of 7.2 kHz, corresponding to a glide slope of 6.3°, and its indicative of the simple and convenient manner by which glide slopes other than the standard 3° can be implemented.

Figure 4:
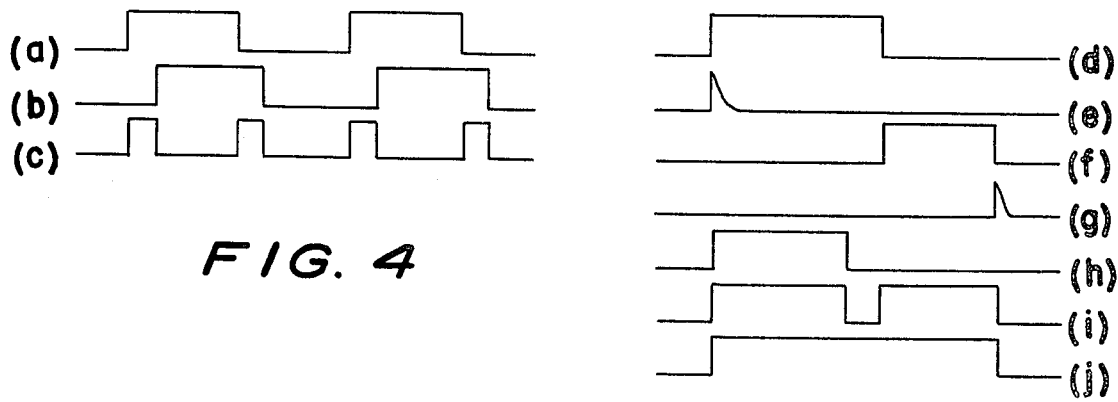
FIG. 4 is a wave-form diagram useful to the understanding of the construction and operation of the system of FIG. 3.

The noted doubler operation may be understood from the waveforms shown in lines (a) through (c) of FIG. 4. As illustrated in FIG. 3, the 3.6 kHz signal on lead 94 is coupled directly, and through a HC delay network 104 as the two inputs to the EXCLUSIVE OR circuit. These are shown respectively in lines (a) and (b) of FIG. 4. Since the EXCLUSIVE OR provides a high output when one, but not both inputs are high, delay circuit 104 produces two outputs for each clock cycle: one at the beginning of the cycle before the delayed input goes high, and again at the end of the signal before the delay input goes low. The resulting waveform is shown in line (c) of FIG. 4.

Before describing the operation of the system, several points should be noted. First, in the preferred construction of display processor 68 utilizing type 74144 IC's, there is provided a CLEAR input to reset the counters, a LATCH STROBE input for transferring the current count to a set of memory latches, a CLOCK input by which the counters are advanced, and a BLANK input by which on-off activation of the actual digital display may be achieved.

As another preliminary point, it will be realized from the discussion of Equations (1) and (2) that several scaling operations are provided for. Most obvious, is the conversion of the 108 kHz clock to a 3.6 or 7.2 kHz clock by which display processor 68 is advanced. Less obvious, but equally important, is the fact that the range block signal (because it gates the clock signal and triggers the waypoint altitude single shot at its trailing edge) is also scaled from a signal representing nautical miles, to one representing altitude in feet. The former function is accomplished explicitly by divide-down counter 92, but the latter function is inherent. This will be understood from the following description of the sequence of operations by which the vertical guidance computer of this invention is preprogrammed and utilized.

After the system has been turned on, the first required operation is establishment of the waypoint altitude (MSL). This is accomplished by placing switch 54 in the W.P. position, and adjusting resistor 44 until display 82 shows the predetermined waypoint altitude. In this mode, the clock pulses on lead 72 are gated through AND gate 70 by the output of the waypoint single shot. The leading edge of an incoming range block shown in line (d) of FIG. 4 clears the counter portion of display processor 68 through differentiator 74 (see FIG. 4, line [e]). Because of invertor 38, single shot 42 remains inactive until triggered by this trailing edge (see line [f] of FIG. 4). During this time, AND gate 70 is also inhibited, and the counter portion of processor 68 remains at rest. When single shot 42 is triggered, the counter advances at the rate of the incoming clock signal.

When single shot 42 times out, inverter 64 triggers the LATCH STROBE input, the current count is stored and displayed. Since the scaling has been chosen so that each divided down clock pulse represents 100 feet, the number of pulses counted during the active period of single shot 42 is a direct measure of the selected waypoint altitude.

Following the setting of the waypoint single shot 42, the minimum descent altitude is set. For this switch 54 is placed in the MDA position, and resistor 50 is adjusted in accordance with predetermined minimal waypoint altitude on display unit 82. For this operation, clock signals are gated through AND gate 70 by the output of OR gate 52. The character of the latter signal depends on the relative durations of the on-time of the MDA single shot 48 (see line [h]) and the duration of the range block, since its trailing edge triggers the waypoint single shot 42. By way of (i) of FIG. 4, shows the output of OR gate 52 for an active period for the MDA single shot shorter in duration than the range block signal. Thus, the MDA single shot times out before the trailing edge of the range block triggers the waypoint single shot producing a notch in the waveform.

As can be appreciated, if the MDA single shot times out exactly at the end of the range block signal, triggering of the waypoint single shot causes the notch to disappear. In that event, the output of OR gate 52 is identical to the waveform shown in line (j) of FIG. 4. This is not a situation encountered in practice, however, since the required adjustments are made at a range substantially greater than that corresponding to the minimum descent altitude nd the timing out of the MDA single shot coincident with the trailing edge of the range block occurs only for the minimum descent altitude range.

Referring still to waveform (i), the count stored in processor unit 68 advances except during the notch. Since the waypoint single shot has already been set, it may be appreciated that the total count corresponding to waveform (i) represents the sum of the minimum descent altitude (in 100's of feet) above ground level, plus the correction factor for the waypoint altitude. Thus, the count stored in the latches at the end of a computation cycle, and displayed by means of display unit 82, represents the minimum descent altitude (MSL) selected by resistor 50.

Finally, it should be recognized that because the least significant two digits of display 82 are hard wired to display zero's at all times, utilization of only two counter stages, that is, IC's in processor 68 requires a scaling of the basic 108 kHz clock such that each cycle represents a distance of 100 feet. The resulting 100 foot resolution has proved to be of completely satisfactory accuracy.

The system is now prepared for normal operation. For this purpose, switch 54 is placed in the CAC position and the advance of the counter portions of processor 68 is controlled by the output of OR gate 60. As will be appreciated, at the end of a computation cycle, the count stored in the latches, therefore, represents the computation corresponding to Equation (2) above, i.e. the required altitude of the aircraft above the ground plus a correction for the mean sea level of the "ground". And again, because the count has been scaled to represent distance in 100's of feet, the resulting display is a direct indication of the command altitude (MSL).

As previously mentioned, one of the important features of the invention is the utilization of the minimum descent altitude to flash the display, and prevent a further reduction is the displayed command altitude. To this end, there is provided flasher 80 as previously mentioned, and a comparator circuit 106, the purpose of which is to generate a signal on lead 108 indicating that the range block has terminated but that the MDA single shot 48 has not yet timed out. As will be appreciated, the latter condition indicates that the aircraft has closed to a range less than that corresponding to the minimum descent altitude.

Flasher 80 and comparator circuit 106 may be constructed in any suitable fashion such that an aircraft range less than that corresponding to the minimum descent altitude produces an intermittent operation of display unit 82 as a result of activation of the BLANK input to processor 68. For example, comparator 106 may be a pair of cross coupled AND gates operating as a flip flop, and flasher 80 may be an astable multivibrator connected such that its operating is inhibited so long as the MDA signal is of shorter duration than the range block. One suitable circuit for flasher 80 is a Type 555 timer manufactured by the Signetics Corporation or its equivalent, coupled for free-running operation through a suitable charging circuit controlled by comparator 106. The flasher is advantageously arranged to operte with a timing cycle of 1 second, whereby the output display is on for approximately ½ second and off for ½ second.

At the same time, the MDA single shot 48 and the range analog signal are both coupled through OR gate 68 as the control input for AND gate 70. Thus, because the duration of the MDA signal exceeds that of the range block for all computation cycles, the displayed command altitude (which flashes on and off) is the MDA value, corrected to MSL by the waypoint altitude signal from single shot 42 through OR gate 60.

As an additional feature, a BLANKING signal from the RNAV computer provided a lead 78 is also coupled through OR gate 76 so that if computer is inoperative or its display is blanked for some other reason, the vertical guidance display is also blanked.

In the above description, there has been disclosed the construction and operation of an improved vertical guidance system having a variety of important and improved features. However, the embodiment shown, though preferred, is intended only as illustrative, and it will be appreciated that a number of changes are contemplated within the scope of the invention. For example, while the system has been described in the context of RNAV systems such as shown in the Bean and Abnett et al. patents, it should be appreciated that the invention is compatible with other RNAV systems as well. For example, other range data formats such as voltage rather than time analog may readily be accomodated, either by voltage to time conversion or even by direct analog processing. For digital operation, a self-contained clock, rather than the RNAV clock may be used; and means may be provided for adjusting the time rate or for selecting one of several discrete rates. Of course, other circuit implementations beside that shown are likewise contemplated.

Thus, the above description should be understood to be for purposes of explanation only, while the actual scope of the invention is defined by the claims appended hereto.

We claim:

1. A vertical navigation guidance computer comprising means for receiving first signal representing the range from an aircraft to a target location; means for generating a second signal representative of a desired descent rate; means for generating a third signal representing the altitude of the target location above the mean sea level; processing means responsive to said first, second, and third signals for generating a command altitude value in accordance with the equation:

$$C.A. R \tan (a) + A$$

where C.A. is the command altitude, R is the range, (a) is a desired descent angle, and A is the altitude above mean sea level of the target location; means to display the generated value of C.A. and means to generate a fourth signal representing a pre-determined minimum altitude above the target and means responsive to the command altitude being less than the minimum descent altitude to provide an alarm signal.

2. Apparatus in accordance with claim 1 wherein said first and third signals are time analogs of the respective values, wherein said second signal is of a pre-determined frequency in accordance with the required value of (a) and wherein said processing means include means for counting the number of cycles of said second signal occuring during the time intervals of said first and third signals.

3. Apparatus as defined in claim 2 further including means to adjust the duration of said third signal, and means to adjust the frequency of said second signal.

4. Apparatus as defined in claim 1 wherein said computer means comprises means to compare the value of R tan (a) +A with the fourth signal and to provide said alarm when R tan (a) +A is less than the value of said fourth signal.

5. A vertical navigation guidance apparatus comprising means to receive a range signal, representative of the range from an aircraft to a target location; means to generate a clock signal, the frequency of which represents a desired angle of descent toward said target location; counter means; means to establish a counting interval; gating means to gate said clock signal to advance said counter during said count interval; means to store the count of said counter output at the end of said counting interval; and means for displaying said count as a measure of command altitude.

6. Apparatus as defined in claim 5 further including means for generating a target altitude time pulse signal from a predetermined setting of said target, the duration of which is representative of the altitude of the target location above mean sea level; and wherein said means for establishing said counting interval includes means for generating a signal representing the combined duration of said range analog signal and said target altitude analog signal.

7. Apparatus as defined in claim 6 wherein said means for establishing said counting interval comprises means to generate a signal, the duration of which represents the altitude above mean sea level of said target location; means responsive to the end of said range analog signal to initiate generation of said target altitude analog signal; means responsive to the end of said target altitude analog signal to terminate said counting interval.

8. Apparatus as defined in claim 7 including means responsive to the beginning of said range analog signal to clear said counter means; count storage means; and means responsive to the end of said counting interval for transferring the count from said counter means to said storage means.

9. Apparatus as defined in claim 7 further including means to adjust the duration of said target altitude time pulse signal; and means for selectively gating signals into said counter only during said target altitude signal to facilitate the adjustment of the duration thereto in accordance with such predetermined setting.

10. Apparatus as defined in claim 7 further including means responsive to the beginning of said counting interval to generate a signal, the duration of which represents a minimum descent; means responsive to the beginning of said counting interval to generate said third signal; means responsive to said command altitude and said last manual signal to generate an alarm if said first signal ends before said third signal.

11. Apparatus as defined in claim 10 further including means to establish a second counting interval representing the duration of said clock signal and said third minimum descent signal; means to adjust the duration of said minimum descent signal, and means for selectively gating said counter during said second counting interval.

12. Apparatus as defined in claim 5 including means for generating a signal, the duration of which represents a minimum descent altitude above said target location; and means for comparing the duration of said command signal and said minimum descent signal and for generating an alarm when the duration of said minimum descent signal exceeds the duration of said command signal.

13. Apparatus as defined in claim 5 wherein said means for establishing said counting interval comprises means to generate a second signal, the duration of which is representative of the altitude of said target location above mean sea level, means for generating a third signal, the duration of which is representative of a minimum descent altitude above said target location; means responsive to the beginning of said first range time pulse signal for clearing said counter means, and for initiating the generation of said minimum descent third signal; means responsive to the end of said range analog first signal for iniating generation of said altitude second signal; first logic means coupled to said first range time pulse and minimum descent first and third signals to provide an output when either of said first or third signals is present, second logic means coupled to said means for generating said second altitude signal and to the output of said first logic means to generate a signal when either of its inputs are present; means for gating said clock signals to said counter whenever the output of said second logic means is present; and means responsive to the end of the output of said second logic means for terminating said counting interval.

14. Apparatus as defined in claim 13 further including digital display means connected to said counter and wherein the frequency of said clock is such that the count produced by said counter means represents the value of the command altitude in units of distance to a predetermined resolution.

15. Apparatus as defined in claim 14 wherein the least significant digit of said display is hard-wired to produce a constant zero value, and where the frequency of said clock is such that each count represents the smallest value of the least significant non-zero digit of the display.

* * * * *